United States Patent [19]
Bush

[11] 3,775,058

[45] Nov. 27, 1973

[54] METHOD AND APPARATUS FOR MIXING LIQUIDS

[75] Inventor: Brian Bush, London, England

[73] Assignee: Adler Auto Precision Ltd., New York, N.Y.

[22] Filed: Mar. 8, 1971

[21] Appl. No.: 121,737

[30] Foreign Application Priority Data
Mar. 13, 1970 Great Britain.................... 12,202/70
June 19, 1970 Great Britain.................... 29,886/70
Aug. 22, 1970 Great Britain.................... 40,554/70
Sept. 18, 1970 Great Britain.................... 44,545/70
Sept. 18, 1970 Great Britain.................... 44,546/70

[52] U.S. Cl. ............ 23/230 R, 23/230 B, 23/232 C, 23/253 R, 23/259, 73/23.1, 141/1, 141/183, 159/3, 159/4 B, 159/48 R, 159/48 L, 195/103.5 R, 195/127, 204/164

[51] Int. Cl. ..................... B65d 47/18, G01n 31/00

[58] Field of Search ..................... 23/230 R, 230 B, 23/253, 259, 232 C, 1 R, 1 US; 141/1, 183; 222/420; 259/1 R

[56] References Cited
UNITED STATES PATENTS
3,380,584  4/1968  Fulwyler ....................... 23/253 UX
3,038,532  6/1962  Eisenkraft ....................... 159/4 B
3,545,502  12/1970 Nunlist ............................ 141/131

OTHER PUBLICATIONS
Schneider et al., "Source of Uniform-Sized Liquid Droplets," Review of Scientific Instruments, Vol. 35, No. 10, pp. 1349–1350, Oct. 1964.

Primary Examiner—Joseph Scovronek
Attorney—Robert L. Stone

[57] ABSTRACT

Method wherein droplets of liquid are formed by passage of the liquid through a droplet generator to form a stream of droplets typically by piezoelectric means. Droplets directed in contact with a different liquid rapidly diffuse into the latter liquid. By this technique controlled amounts of chemicals may be mixed reacted and subjected to analysis. Apparatus for carrying out this method includes means for producing at least one stream of droplets and means for directing droplets in desired directions. Furthermore, droplets of liquid may be automatically dispensed into moving containers. Additionally, droplets of a solute in a solvent may be concentrated by removal of solvent, evaporated and subjected to chromatographic analysis.

34 Claims, 15 Drawing Figures

INVENTOR-BRIAN BUSH

ANALYZE

A. POSITION OF VALVE 209

B. FLOW OF SOLUTION INTO REACTION VESSEL 224

C. PHOTOMETER MEASUREMENT

D. PHOTOMETER MEASUREMENT

INVENTOR - BRIAN BUSH

INVENTOR- BRIAN BUSH

METHOD AND APPARATUS FOR MIXING LIQUIDS

This invention relates to method and apparatus for mixing liquids which are particualarly suitable for chemical and physical analysis.

In accordance with certain of its aspects, this invention relates to a method for mixing chemicals in liquid form which comprises passing a first liquid through a drop generator to produce a stream of substantially uniformly sized droplets and electrostatically charging and directing at least one of said droplets from said stream into contact with a different liquid to rapidly diffuse the first liquid into the different liquid.

In accordance with certain additional aspects of this invention an apparatus is provided for effecting mixture of a uniformly sized stream of droplets of a first liquid with a different liquid which comprises means for producing a stream of droplets of a first liquid, means for electrostatically charging said droplets and control means for controlling the direction of droplets and means providing a different liquid in position such that at least one of said droplets of said first liquid is brought into contact with said different liquid to rapidly diffuse therein.

In the practice of this invention, highly accurate and exact chemical and physical analysis may be made. Particularly accurate analysis of blood serum components may be determined. The principal aspects of this invention may be described in a number of embodiments which are illustrated in the drawings.

In FIG. 1, an apparatus and method is depicted in which a stream of droplets of a chemical liquid sample to be analyzed is formed, reacted with a falling drop of a chemical liquid reagent and subjected to analysis.

In FIG. 2, droplets formed in FIG. 1 are shown more specifically and selected droplets are shown being brought into contact with the falling drop.

In FIG. 3, an apparatus is depicted in which droplets of two chemical liquids are formed, brought into reactive contact by rapid diffusion of one droplet into the other and subjected to chemical analysis.

In FIG. 4, a holder is depicted which contains a plurality of reaction vessels which can receive the reaction product formed in FIG. 3.

In FIG. 5, a filter wheel is depicted which contains a plurality of optical filters which can be used in analyzing reaction product formed in FIG. 3.

Figure 10:
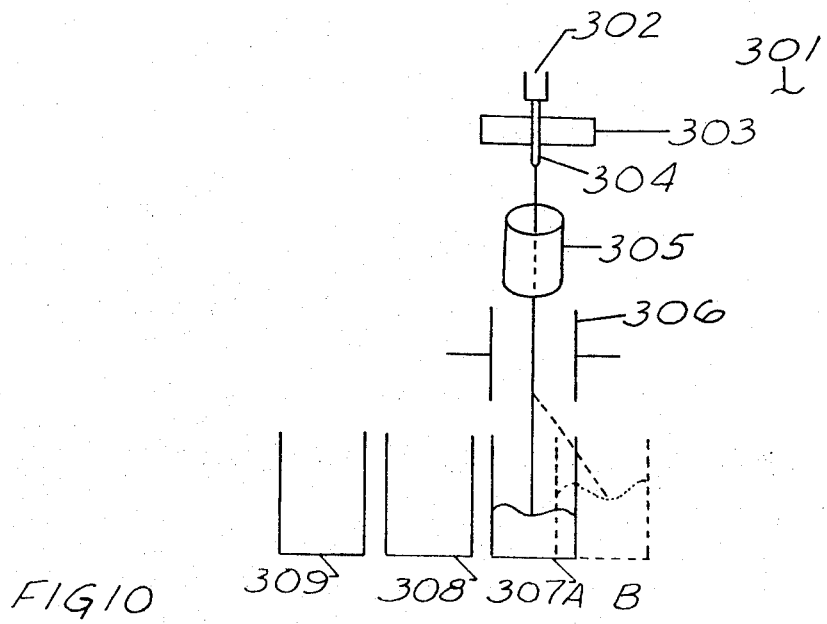

In FIG. 10, droplets are shown being directed into a moving vessel to accurately dispense desired volumes of liquid into the vessel, as additional vessels are continuously brought into position to receive such droplets.

Figure 11:
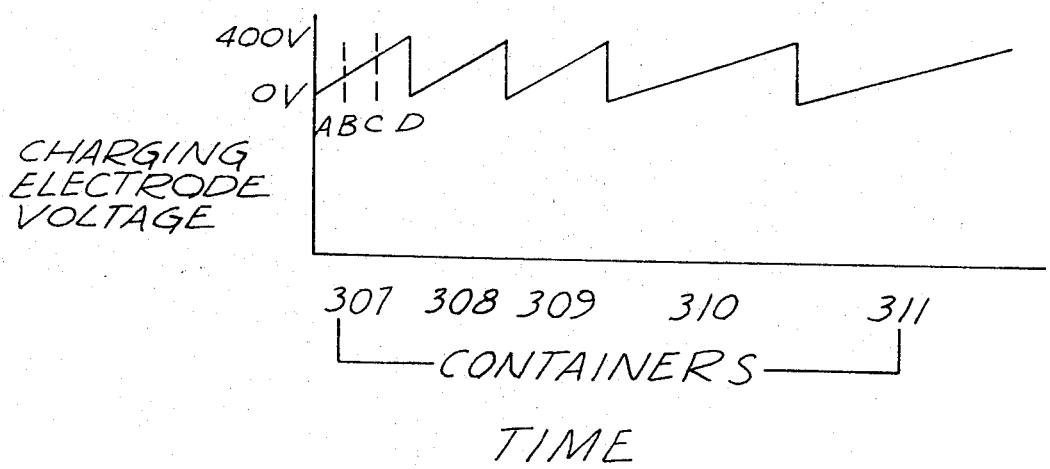

FIG. 11 is a timing diagram showing the electrical wave form applied to the charging electrode which forms droplets in FIG. 10.

Figure 12:
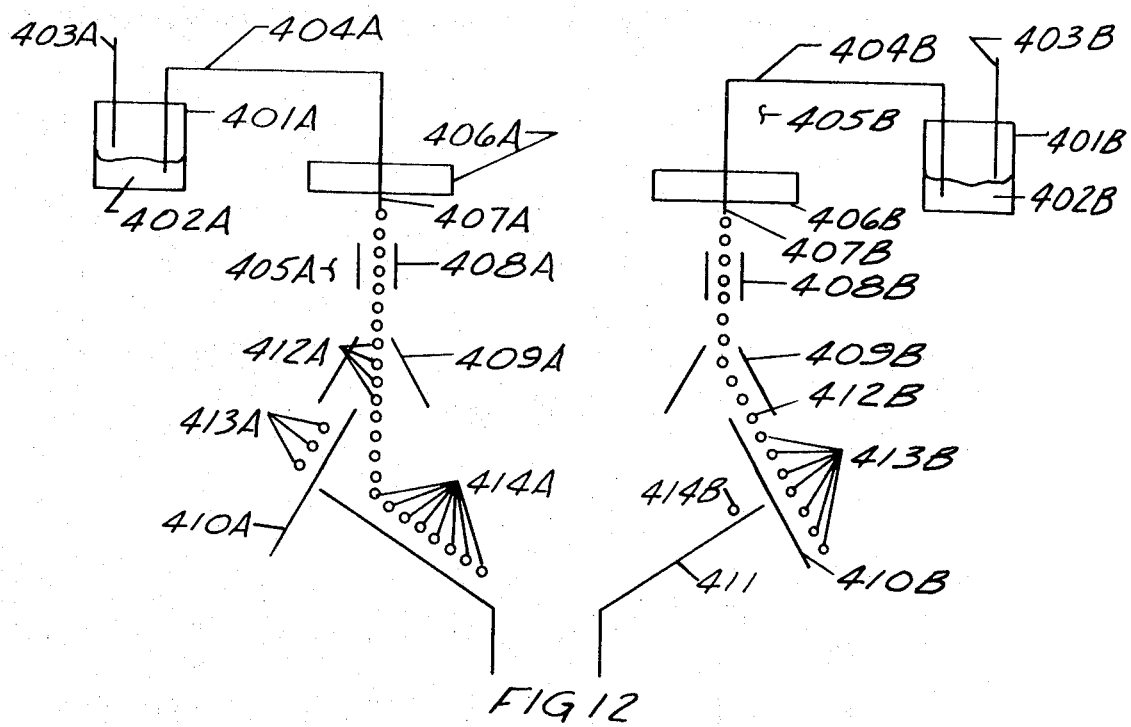

FIG. 12 is a diagrammatic side view of an apparatus for mixing gradients for liquid chromatography.

Figure 13:
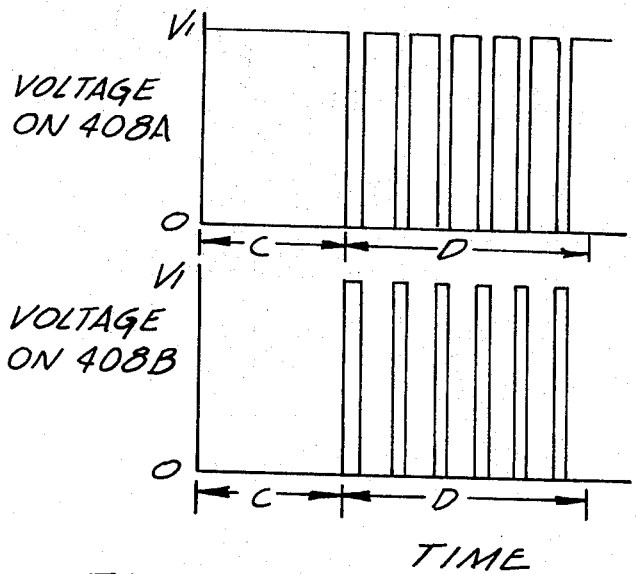

FIG. 13 is a timing diagram showing the operation of the various components of the apparatus of FIG. 12.

Figure 14:
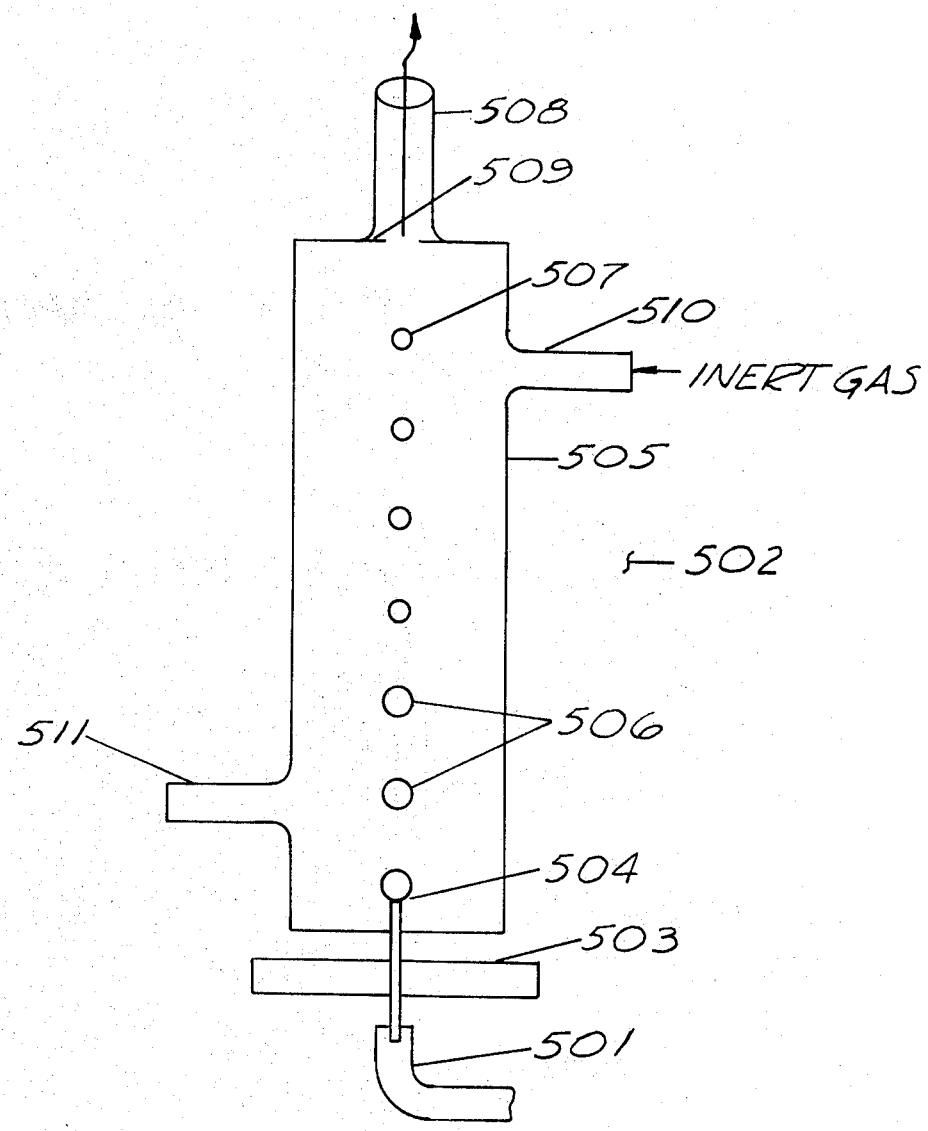

FIG. 14 is a diagrammatic side view of an apparatus for removing solvent from column effluent in liquid chromatography, converting the remaining effluent to a vapour and measuring the magnitude of a physical property of this vapor.

Figure 15:
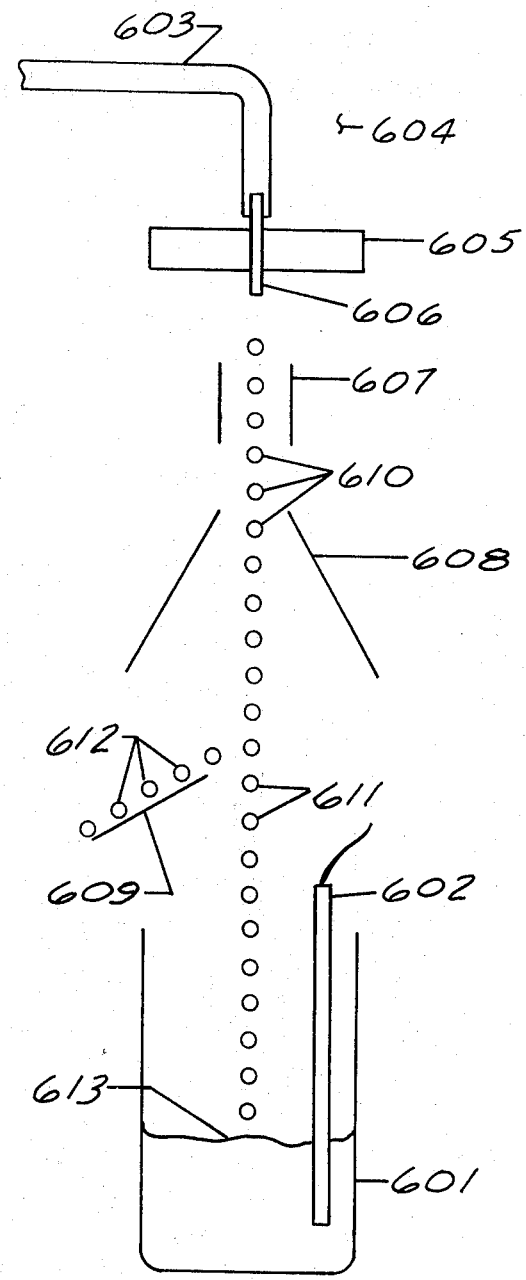

FIG. 15 is a diagrammatic side view of an apparatus for titrations or adjusting solutions parameters.

In the prior art, apparatus for mixing liquids which are reacted and analyzed have generally been built from:

a. A sample holder which is usually a tray containing tubes of sample for analysis, for example, samples can be placed in small cylindrical containers of about 4–10 ml. capacity and mounted at the surface of a tray which can be synchronously rotated to present each sample at the input tube of the pumping mechanism;

b. Pumping mechanisms which pump sample for analysis and appropriate reagents therefor, so that samples and reagents can be continuously pumped through separate tubing with peristaltic pumps or in discrete volumes with piston pumps;

c. Reaction vessel, which may be a discrete vessel such as a cylinder of about 5–12 ml., say 5 ml., capacity, or a tube through which chemicals continuously flows to mix and react with samples.

d. Detectors which measure a physical property of the sample-reagent mixture or reaction product which property is related to the concentration of the species of interest in the sample; for example, the detectors could be a photomultiplier, which measures the intensity of radiation from a light source and transmitted by the sample-reagent reaction mixtures; and e. Signal processing and read out system which process the signal from the detector and read it out in appropriate form; for example, this could be an electronics system which measures the magnitude of the electrical signal generated at a photomultiplier by radiation transmitted by a reaction solution containing sample and reagent and which compares this with the signal generated by radiation passing through a balnk solution, thereby enabling the system to calculate the ratios of these signals and read it out onto a meter.

Various apparatus for automatic wet chemical analysis are in wide use, but such instruments still have a number of disadvantages including:

a. In order to obtain precise results, it is necessary to precisely measure the volume or mass of sample and of reagents. This is still a problem with small sample and reagent volumes.

b. Present instruments usually have large dead volumes, containing sample or reagents which will not be used in the detection process. This wastes sample and reagent, and hinders the washing of the apparatus between successive analysis.

c. Present instruments require reasonably large samples, because of *a* and *b* above.

d. It is usually necessary to wash out the reaction vessel and other parts of the apparatus between successive samples. This is time consuming, and inadequate washing will cause systematic error.

e. Sample and reagents must be thoroughly mixed to ensure a controlled or complete chemical reaction. Present methods of mixing are inefficient, requiring repetitive mixing operations or long waiting times.

f. For chemical reactions requiring heating, sample and reagent are usually mixed at room temperature and then transferred to a heating bath. A considerable part of the total analysis time is utilized in bringing the sample-reagent mixture of the reaction temperature.

g. Because of d, e and f above, there is usually a considerable time lag between introduction of a given sample into the instrument and read out of the analytical result.

h. Alteration of the sample-reagent ratio necessitates physically changing a pump or pump tube in the instrument. This is slow and inconvenient.

i. Present instruments are usually designed to measure a physical property of chemical reaction which has reached equilibrium, or which has a certain (constant) degree of completion. They are not suited to continuously monitoring a physical property during the course of the reaction.

j. Present instruments are often large and expensive. For example, they may contain multiple heating baths and complicated pumping equipment.

k. Present apparatus uses large quantities of reagent, and this is expensive. l. With present apparatus for the simultaneous analysis of several components in a sample, the sample is usually divided into several aliquots, and each aliquot is separately processed. Because of the difficulty in handling small samples, each aliquot cannot be too small, therefore, the total sample volume required is high.

In the practice of the instant invention, the drop generator is employed to form small droplets of uniform size. These can be rapidly injected and diffused into another liquid. Thus, when analysis of the contracted liquids is desired, intimate contact of liquids occurs within milliseconds and meaningfull observations can begin very quickly.

AUTOMATIC WET REACTION AND ANALYSIS WITH A FALLING DROP AND A DROP GENERATOR

The apparatus and method of the invention is superior to the prior art and substantially overcomes the disadvantages set forth above. In one embodiment of the inventions particularly illustrated in FIGS. 1 & 2, an apparatus in which at least one liquid droplet is rapidly diffused into a falling drop of another liquid is depicted. Typically, chemical reaction occurs and the reaction product is subjected to analysis.

Figure 1:
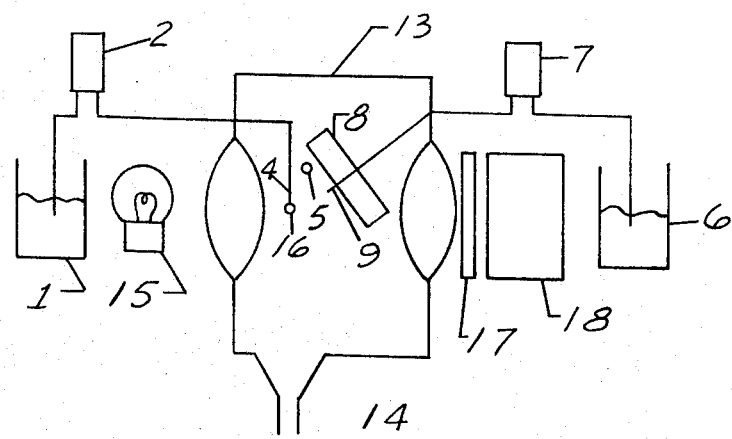
Figure 2:
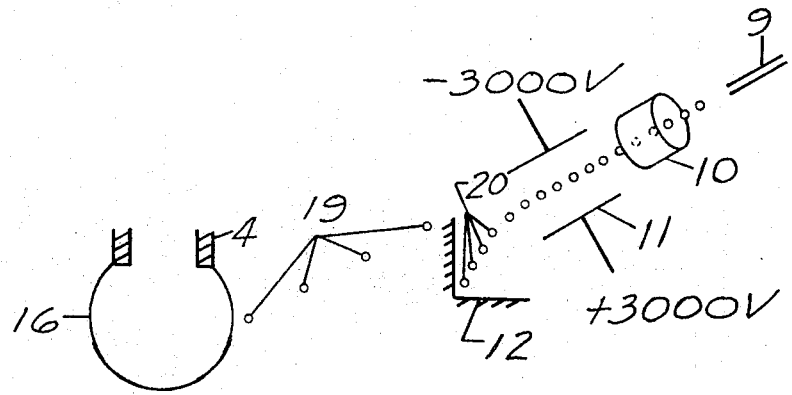

The main features of the embodiment of the invention illustrated in FIGS. 1 & 2 are:

a. It utilizes the precise measurement capability of a drop generator to accurately measure sample and sometimes reagent volumes.

b. These droplets can be electronically pulsed out of a stream of droplets permitting electronic rather than physical selection of sample-reagent ratio.

c. Segmentation of the sample into samll droplets and projection into or collision with drops of reagent results in very rapid mixing and hence rapid chemical reaction.

d. A single droplet of reagent suspended in a gas may be used as a reaction vessel and sample cuvette. There is minimal contact with walls, and this simplifies washing procedures.

e. The processes of sample-reagent mixing, chemical reaction, heating and even photometric or other form of detection may be carried out in one vessel.

f. The whole apparatus can be readily constructed as a small simple unit.

g. The apparatus is particlarly well suited for the analysis of reaction products of several sample components for analysis.

The method of this embodiment of the invention comprises passing a first liquid through a drop generator to produce a stream of uniformly sized droplets, forming a suspended drop of a different liquid, bombarding said suspended drop with at least one droplet of said first liquid thereby causing chemical reaction between the two liquids. The course of the chemical reaction may be monitored and analyzed.

The apparatus of this embodiment comprises means for producing a stream of substantially uniform droplets of a first liquid, means for producing a suspended drop of a different liquid, means for electrostatically charging said droplets of first liquid, means for controlling the path of said droplets, whereby at least one droplet is directed into contact with said suspended drop to rapidly diffuse therewith.

The control means may electrostatically deflect selected drops from an undeflected path to a deflected path to assure the desired degree of bombardment of the falling drop. Chemical reaction takes place between the two liquids and means may be provided to monitor the course of the reaction by measuring a transmittance property or other property of the reacted suspended drop. Means may also be provided for removing the reacted suspended drop and permit its replacement by another drop.

Referring specifically to FIGS. 1 & 2 in which specific chemicals and amounts are set forth which are illustrative of the invention and which can be varied in manners apparent to one skilled in the art:

A vessel 1 contains reagent, say cholesterol reagent (Lieberman-Burchard) for the determination of cholesterol in blood serum. This reagent is typically a solution containing 350 ml. of glacial acetic acid, 550 ml. of acetic anhydride, 100 ml. of sulphuric acid and 10 g. of anhydrous sodium sulphate. A small volume of the reagent is pumped by a reciprocating pump 2 or other suitable pump in a discrete pumping operation along tube 3 where it forms a drop 16 at the tube tip 4. To effect pumping, a compressed air driven piston moves in a cylinder and delivers the drop 16 at the tip 4. The drop may typically be about 0.03-0.5 ml., say 0.03 ml. in volume.

A device, such as a small solenoid operated rod 5 is used to strike the reagent tube, and dislodge the drop 16 generally after it has been reacted and typically after analysis. The sample for analysis, such as the sample to be analyzed with the cholesterol reagent, is contained in a sample cup 6, and is similarly pumped using pump 7 to a drop generator. The drop generator employed in this and additional embodiments of the invention is preferably a piezoelectric transducer of the type described by Schneider et al. in the Review of Scientific Instruments, Volume 35, No. 10, pages 1,349–1,350 (Oct., 1964).

This latter device is more clearly shown in FIG. 2 as containing a capillary tube 9, vibrated by a piezoelectric crystal 8 and fitted with a charging electrode 10 and deflecting electrodes 11. The capillary tube 9 could be made from corrosion resistant steel and may have an internal diameter of about 0.13–1.27 mm, say 0.5 mm typically tapering to or having an aperture of about 0.05–0.8 mm at the tip. The piezoelectric crystal may be any such in the art. Lead zirconium titanate about 2.5–5 cm: say 3.8 cm long and about 0.6–1.3 cm wide is particularly desirable. It is capacitively coupled and driven or vibrated typically using a 200 volt peak-to-peak sine wave at 700–10,000 Hz. The charging electrode 10 which induces a charge on the droplets 20 could be cylinder of copper or corrosion resistant steel, about 0.5–1.5 cm, say 1 cm long and about 0.2–0.8 cm, say 0.5 cm in diameter. It may also be a ring. The deflecting electrodes 11 can be metal plates about 1.2–3.8 cm, say 2.5 cm long in the direction of the stream and about 0.6–1.9 cm, say 1.3 cm wide and apart and preferably embedded in an insulating material to prevent contact with the charged plates. The charging electrode voltage is typically about 400 volts, that voltage being particularly desirable, and the typical deflective plate voltages are about ± 3 kv. Uniformly sized droplets can be selectively pulsed out of the stream by applying a periodically varying voltage, e.g. one droplet in four may be uncharged 19 to permit it to pass to, bombard and rapidly diffuse and coalesce into the hanging reagent drop 16. The voltage and the time during which droplets are dispensed may be varied with dial controls. The charged droplets which are deflected by pulsing 20 are deflected to a trap 12. Thus as the sample is pumped through the capillary tube 9, it emerges as a stream of liquid which is broken into uniformly sized droplets by vibrating action and, as required, droplets 20 can be pulsed out from the main stream. In place of the drop generator 8 illustrated herein and in additional embodiments of the invention, other devices for generating a stream of substantially uniformly sized droplets which may be employed include electromechanical devices such as an electromagnetically driven diaphgram, as is used in a loudspeaker, or a fluidic device in which a stream of liquid is rapidly segmented into paths of small droplets.

The drop generator 8 and the reagent tube 3 are enclosed in a vessel 13 which is maintained at an appropriate temperature, typically 25°C, in a determination of cholesterol. The vessel 13 is also fitted with an outlet tube 14 to waste. A detector system may be positioned so as to be able to monitor a physical property of the drop 16 as it is contacted with droplets of sample 19. For example, the absorbance could be monitored by focussing radiation from a lamp 15, such as a tungsten lamp which emits continuum ultraviolet and visible radiation through the drop 16 to an optical filter 17 and photodetector 18. The radiation from the lamp is typically focussed using a convex lens or other optical system on the reaction material (the drop 16). From there it passes to an optical filter 17, such as a dielectric filter with a peak transmission at 630 nm for cholesterol determination. Alternatively, a prism, a grating or other means of spectral resolution could be used to isolate the required radiation.

The following typical operating example may be varied depending on the sample to be analyzed.

Cholesterol in blood serum is analyzed as follows. Vessel 1 is filled with a cholesterol reagent solution containing 35 parts by volume of glacial acetic acid, 55 parts by volume of acetic anhydride, 10 parts by volume of sulfuric acid and 1 part by weight of sodium sulphate. A drop 16 of the reagent of 0.03 ml. volume is formed at the tip 4 of tube 3 by pumping with pump 2. The length of tube 3 inside of vessel 13 is sufficiently long that the reagent assumes the temperature in vessel 13. In the case of cholesterol reagent, this temperature is about the same as or slightly higher than room temperature, 25°C.

When the drop 16 hangs from tip 14, the pump 2 ceases operation.

Blood serum including cholesterol is placed in cup 6 and continuously pumped with pump 7 to the drop generator 8.

By preselection 1,000 droplets, each of 0.01 microliter volume are deflected to bombard the reagent drop 16 each second and diffuse into it by operating the drop generator 8 at a rate of 10,000 droplets per second and pulsing every tenth droplet 10 toward the drop 16. The droplets of blood serum 19 diffuse and enter into the relatively large and relatively warm cholesterol reagent drop 16 and form a colored reaction compound still hanging from tip 4. This compound is the reaction product of cholesterol and cholesterol reagent and absorbs light at a wavelength of 630 nm. The concentration of cholesterol in the blood serum is obtained by:

a. Continuously measuring the intensity of radiation at 630 nm and calculating the concentration from the rate of change of intensity. Since the reaction of cholesterol with cholesterol reagent follows the first order of kinetics and since the concentration of reagent greatly exceeds that of cholesterol, the calculation is such that an absorbance at 630 nm is proportional to C cholesterol $[1 - \exp(-kt)]$ where C cholesterol is the concentration of cholesterol in the sample, $t$ is the time after initiation of the reaction and $k$ is constant. Thus, absorbance can be repetitively measured during reaction and concentration of cholesterol can be calculated.

b. Measuring the intensity when the intensity after a predetermined time such as when the reaction is about 80 percent complete. Since the reaction follows the first order of kinetics, the ratio of component concentrations in the unknown and the ratio of standard samples containing cholesterol when each reacts with the reagent under identical conditions is $$a_1/a_o = x_1/x_o, \text{ where}$$

$a_1$ is the unknown cholesterol concentration,
$a_o$ is the known cholesterol concentration and
$x_1$ and $x_o$ are concentrations of the known and unknown cholesterol samples respectively after $t$ seconds.

c. Measuring the intensity when the reaction is complete. After analysis the reacted drop 16 may be knocked off the tip 4 with a small solenoid operated rod 5 and the apparatus readied for a new reaction and analysis.

In the practice of the invention, the apparatus can be calibrated by reacting known samples, such as a sample containing a known amount of cholesterol, with a reagent, such as a cholesterol reagent. When appropriate radiation measurement has been made, device 5 strikes the tube 3 to dislodge the drop 16 from the tip 4. The pump 2 then moves the next drop 16 into position at tip 4.

Samples to be analyzed such as three or more samples may be pumped in sequence, preferably with a small amount of washing solvent, such as water used between each sample tested. Even when washing solvent is used, some sample may carry over into the next sample tested. Thus, when a sample is pumped for 4 seconds, the first 25 percent and the last 25 percent may be contaminated. For this reason, the drop generator 8 is typically programmed to pulse only a preselected number of droplets 19 such as all droplets or one out of 10 or the like to bombard the drop 16 only during the second and third seconds. All other droplets 20 are deflected to trap 12 and waste.

In this procedure with three or more samples vessel 13 is heated to the desired temperature and the reagent is placed in vessel 1. The instrument is switched on and the following cycle begins.

a. Pump reagent and form drop.
 b. Pump sample, form droplets and direct some droplets to reagent drop.
 c. Physical property of reacted drop is read of monitored.
 d. Reacted drop is knocked off.
 e. Wash liquid is pumped through drop generator and deflected to waste.
 f. Procedure is repeated with a second sample.
 g. Procedure is repeated with a third sample, etc.

In this procedure, calibration may be made in several ways, e.g. for an instrument which monitors absorbance, 100 percent transmission may be set by pumping pure solvent to form a drop and setting the signal processing system accordingly. Alternatively, a standard sample may be pumped and transmission continuously monitored from the time sample droplets reach the reagent drop. If this selected number of droplets of sample give a very high optical density which cannot be accurately measured, the number of sample droplets bombarding the reagent drop can be readily reduced to say one droplet in 20 from one droplet in 10 and droplets permitted to make contact for say 2 seconds instead of 1 second.

A modification of this embodiment of the invention includes determination of several components in a sample such as blood serum. This is done by providing several vessels 1 for reagents with pumps 2 and tubes 3 for each reagent. Thus two or more reagents can be used to analyze more components of a complex sample such as blood serum. In this procedure multiple detection system (but typically only one drop generator) are provided.

To determine several components of a sample, sample is pumped and a stream of droplets produced in the drop generator. A preselected number of droplets 19 are pulsed and directed to a first reagent drop 16. Then with the aid of additional deflecting plates 11 or by mechanical movement, a preselected number of droplets are directed to a drop of another reagent. This procedure can be repeated with drops of additional reagents.

For example, if it is decided to analyze blood serum for four components, viz: albumin, alkaline, phosphatase, cholesterol and blood urea nitrogen, the approximate reagents; HABA dye for albumin, alkaline phosphatase buffer and AMP buffer for alkaline phosphatase, cholesterol color reagent for cholesterol and BUN color and BUN acid for BUN are pumped through separate tubes. The drop generator is programmed and directed to bombard, say, 1,000 droplets to the drop of HABA dye, 10,000 droplets to the alkaline phosphatase buffer and 10,000 droplets to the AMP buffer, 1,000 droplets to cholesterol color reagent and 5,000 droplets to BUN color reagent and 5,000 droplets to BUN acid. Separate measurements are made on each reacted drop.

The "falling drop" embodiment of the invention has the following noteworthy advantages over prior practice.

a. The volume of small samples can be measured with high precision.
 b. Dead volume is very low.
 c. Total sample volume is low, typically 50 microliters, even for multiple analyses.
 d. Reagent consumption is low, typically 0.1 ml per sample.
 e. There are few problems with carry over and cross contamination.
 f. The sample dispensing and mixing with reagent process is very rapid.
 g. The time lag until analytical results are ready is low, typically under 1 minute.
 h. Sample-reagent ratios can be selected using a dial control.
 i. The whole apparatus is small and inexpensive.
 j. It is possible to measure reaction rates with the instrument.

It is noted that embodiments of the invention may be modified by providing a container which encloses the reagent drop 16 and which have an inlet hole to receive sample droplets 19 and a narrow exit port through which reaction product is removed. This technique provides protection for the process should the reagent drop 16 prematurely fall off the tip 4 due to instability, perhaps from mechanical vibration. In this manner the droplet is retained in the container. If several reagents are used, several narrow entrance ports can be provided. Optical Measurements can be made of reaction product in the container. Care should be taken to wash the container between reactions.

AUTOMATIC WET REACTION AND ANALYSIS WITH A PLURALITY OF DROP GENERATORS

In accordance with additional embodiments of the invention, an apparatus and a method are provided in which the "falling drop" apparatus and technique hereinbefore described is modified to provide a drop generator for the liquid reagent and to generate droplets of the reagent. Preselected amounts of the reagent droplets are contacted with droplets of a liquid chemical sample which rapidly diffuse therein. Typically means for analysis are provided and the reacted droplets are analyzed. These embodiments provide the advantages over prior practice hereinbefore described with regard to the falling drop embodiments and have additional advantages in more exact control over the reaction.

In accordance with an embodiment of this invention an apparatus is provided which comprises means for producing a stream of substantially uniform droplets of a first liquid, means for producing at least one separate stream of substantially uniform droplets of different liquid, separate means for electrostatically charging each of said streams, separate means for controlling the paths of each of said streams, whereby at least one droplet from said stream of said first liquid is directed into a collector and contacted with liquid from a different stream to rapidly diffuse therewith. Means for monitoring the course between the liquids may also be provided to measure the transmittance of the liquid collected.

In accordance with a complementary embodiment of the invention a method is provided which comprises passing a first liquid through a drop generator to produce a stream of droplets, separately passing at least one other liquid though at least one additional drop generator to produce at least one separate stream of droplets of different liquid, directing at least one droplet of said first liquid into a collector and into contact with different liquid thereby causing chemical reaction between the two liquids and collecting the droplet of reaction product in a collector. The course of the chemical reaction may be monitored and analyzed.

Figure 3:
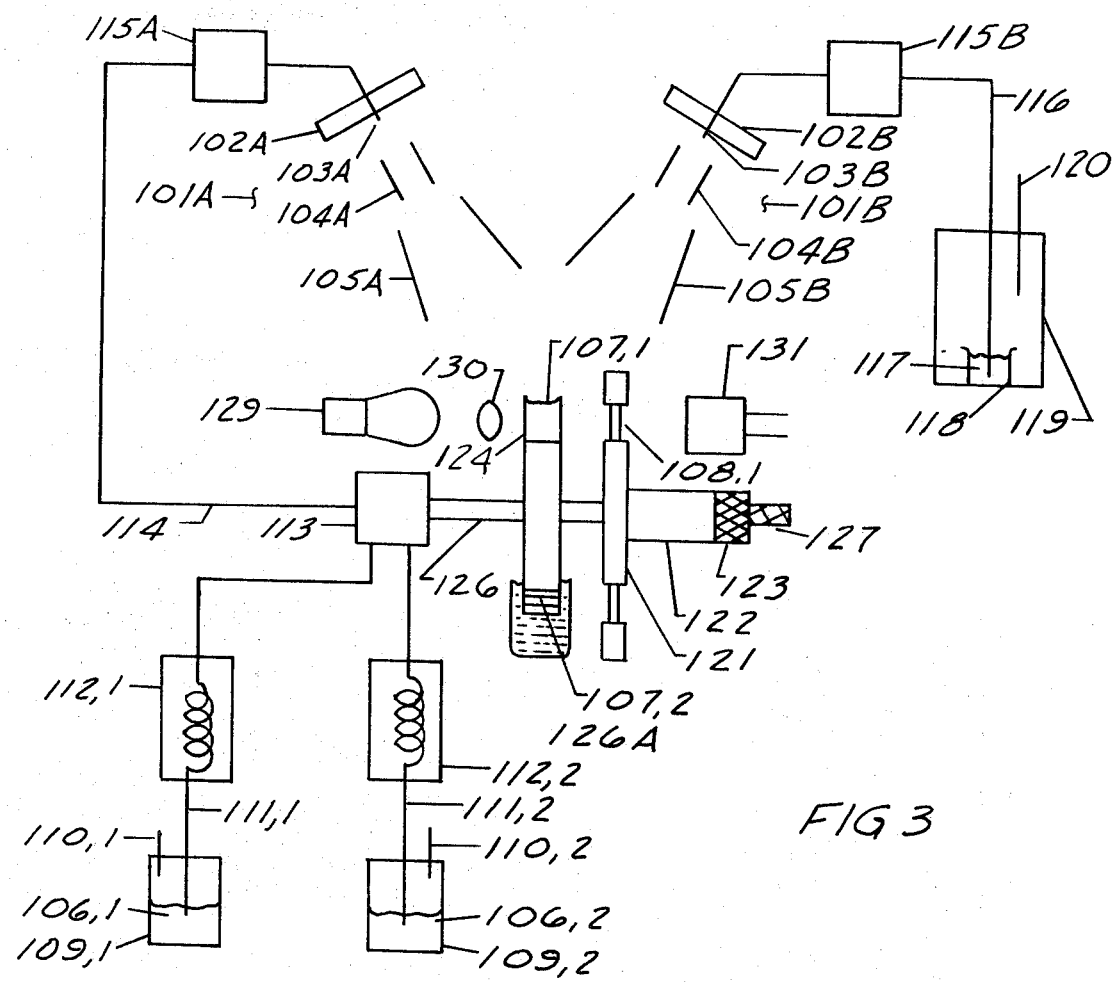
Figure 4:
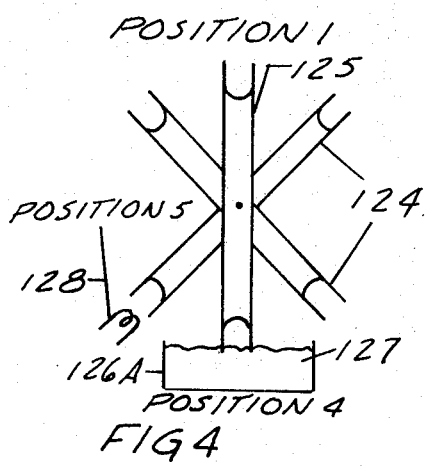
Figure 5:
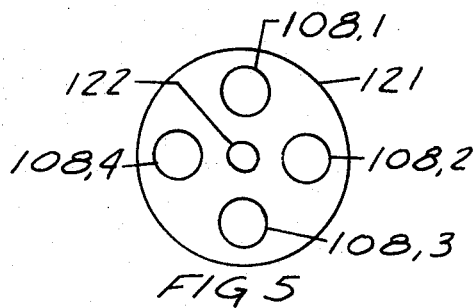

Referring specifically to FIGS. 3, 4 & 5 in which apparatus components, chemicals, voltages and analytical means may be the same as are indicated in the falling-drop embodiments of the invention, except as indicated.

Two dispensing devices, or drop generators, generally represented as 101 A and 101 B, contain piezoelectric crystals 102 A and 102 B, capillary tubes 103 A and 103 B, charging electrodes 104 A and 104 B and deflecting electrodes 105 A and 105 B. The apparatus can be set up to program a number of analyses of components of a sample, such as blood serum; for instance analysis may be made for four components of blood serum.

Analysis 1 typically carried out by reacting reagent 106,1 (such as cholesterol reagent) initially in flask 109,1 with a sample, such as blood serum, 117, initially in sample container 118 and chamber 119 and measuring the absorption of the resulting reaction mixture 107,1 collected in vessel 124 at the wavelength transmitted by optical filter 108,1, such as 630 nm in a cholesterol determination. Analysis 2 is carried out similarly by reacting reagent 106,2 (such as BUN reagent) initially in flask 109,2 with the sample, such as blood serum, 117. Further analyses may be similarly carried out.

In the apparatus, reagents 106,1 and 106,2, as well as unshown reagents, such as 106,3 and 106,4 are placed in separate flasks 109,1 and 109,2 and unshown flasks 109,3 and 109,4.

At a suitable time, reagents are dispensed from these flasks by a suitable pumping means, for example by applying gas at a constant pressure (such as 0.35 kg/cm$^2$) through tubings 110,1 and 110,2 as well as unshown tubings, reagents are dispensed through tubings 111,1; 111,2; etc. to heating baths 112,1; 112,2; etc. if it is necessary to heat reagents to an appropriate reaction temperature; for example, cholesterol reagent is desirably maintained at about 25°C and little or no heating is necessary. Further components of the apparatus are valve 113 which can be set to separately pass the reagents 106,1; 106,2; etc. via tube 114 and valve 115 A to the drop generator dispensing device 101 A.

The sample to be reacted and analyzed 117, such as cholesterol blood serum, is pumped by a suitable means through inlet tube 116. For example, the sample 117 in a sample container 118 is placed in a chamber 119 and submitted to pressure by passing compressed gas into the chamber 119 through tube 120. The sample 117 can then flow through tube 116 to valve 115 B and then to drop generator dispensing device 101 B.

When several reaction products are to be analyzed a filter wheel 121, particularly depicted in FIG. 5, is mounted on shaft 122 and rotated, typically by hand, using knob 123. On this wheel 121, filters 108,1; 108,2; 108,3; and 108,4 are mounted.

Chemical reaction between each of the reagents 106,1; 106,2; etc. and sample 117 is carried out in a collector or transparent reaction vessel 124 mounted as shown on a rotatable reaction vessel holder 125 which is mounted on a shaft 126 which is rotated by knob 127. The holder 125 is particularly depicted in FIG. 4 wherein six reaction vessels 124 are shown. This holder 125 can be rotated through six positions at 60° to one another. The reaction vessel in lowest position 4 in FIG. 4 dips into a trough 126 A which contains a washing liquid 127, such as water, which is automatically agitated and is changed as necessary so as to effectively wash each reaction vessel. At position 5, a heating element 128 is placed which dries the washed reaction vessels 124.

An optical system is provided to analyze the reaction products. It typically contains an appropriate light source 129 and lens 130, which passes radiation through each of the reaction mixtures such as 107,1 in vessel 124 after other reaction mixture such as 107,2 has been radiated and has been passed to wash in trough 126 A. The radiation then passes to filter 108,1 and to photodetector 131. This system is typically used to measure the absorbance of the reaction mixture, such as at 630 nm in a cholesterol reaction. It also may be arranged to measure other physical properties, for example, the intensity of fluorescence radiation from the reaction mixture, with the photodetector at 90° to the light source.

A typical analysis of component 1 (say cholesterol in blood serum sample) is carried out by placing the sample containing the component 1 in its container 118 in a vessel 119 which is then pressurized.

Knob 123 is rotated so that a. the appropriate filter 108,1 is in position between the lamp 129, and the photodetector 131.

b. valve 113 allows reagent 106,1 to flow through tubing 114.

The operator presses a button to activate electronic circuitry to perform the following operations.

a. Open valve 115 A, allowing reagent 106,1 to flow to dispensing device 101 A and emerge from tube 103 A as a stream of droplets. Reagents flowing during the first few seconds may be contaminated by a previous reagent, or may not be heated to the correct reaction temperature, and is deflected by the dispensing device to waste. Thereafter a precisely measured number of droplets of reagents is allowed to stream into the reaction vessel 124 in position 1. When this is complete the stream is deflected to waste again, then valve 115 A is closed. Thus, valve 115 A performs a coarse control function of turning on and off the flow of reagent, and the dispensing device performs a precise control function by allowing a precisely measured fraction of the total reagent flow to enter the reaction vessel 124.

b. Open valve 115 B, allowing sample to flow to dispensing device 101 B and emerge from tube 103 B as a stream of droplets. Sample flowing during the first few seconds may be contaminated with preceding sample, and is deflected by the dispensing device to waste.

Thereafter a precisely measured number of droplets of sample is allowed to flow into reaction vessel 124, the stream is deflected to waste, then valve 115 B is closed.

Thorough mixing of reagent and sample is ensured either by i. simultaneously dispensing reagent and sample, and causing reagent and sample droplets to collide and coalesce in air, and fall into the reaction vessel, or ii. first dispensing a much greater volume of reagent and injecting sample droplets into reagent already in the reaction vessel.

c. Measure the concentration of the sample by measuring the absorbance of the reaction mixture. This can be performed in several ways:

i. by taking a 100 percent transmission reading on reagent solution present in the reaction vessel, adding sample then monitoring the transmission of the reaction mixture, and measuring the time taken for the transmission to be reduced to a given value.

ii. by dispensing reagent for, say, 2 seconds, to half fill the reaction vessel, taking a 100 percent transmission reading on this solution in, say, 0.1 seconds, then allowing reagent and sample to be simultaneously dispensed, with sample and reagent drops colliding and coalescing in air and falling into the reaction vessel, and measuring the time taken for the transmission to be reduced to a given value.

iii. with either of the above solution handling techniques, but by taking a 100 percent transmission reading, waiting for a preselected time, and then measuring the absorbance of the reaction mixture.

There are obviously a number of optional variations on this instrument, e.g. samples and reagents could be pumped with piston and peristaltic pumps, the entire structure containing the reaction vessel could be heated to the reaction temperature, and alternative switching system to valve 113 could be used. Should it be necessary to use, say, two reagents for a particular chemical reaction, an additional drop generator 101,1 (not shown), additional flask 106,1A (not shown), heating flask 112,1A (not shown), etc. are used. The dispensing devices can be timed to dispense preselected volumes of reagents in any preselected time sequence.

When the analysis is complete, knob 127 is rotated to bring a washed and dried reaction vessel into position 1, and a new sample 117 is introduced in container 119, knob 123 is rotated to select a new reagent filter combination, and the next sample may be analyzed for a different component.

This apparatus has a number of important advantages.

i. it has very simple sample handling techniques, permitting the design of simple, small and inexpensive apparatus.

ii. the apparatus is readily maintained in a stand-by position without consuming reagents or wearing out mechanical parts.

iii. it allows fingertip selection of reagents and filters for a particular analysis.

iv. reagents are pre-warmed, if necessary with each reagent at its optimum temperature. This eliminates an incubation step, and hence total analysis time is low.

v. the apparatus is precise, because of the capability of a drop generator of very precise measurement volume.

vi. reaction vessels are automatically washed and dried without time-wasting wash cycle.

vii. the apparatus can be used for measuring rates of chemical reactions.

viii. sample consumption is extremely low.

ix. it offers a particularly convenient means for carrying out reactions at various temperatures using essentially one instrument.

x. the operating procedure is very simple.

xi. the apparatus can also be used for chemical analyses involving solvent extraction. For example, a reagent consisting of an organic solvent and a complexing agent could be first injected into the reaction vessel, followed by drops of sample. The large reagent surface area ensures rapid extraction of the component of interest into the organic solvent. The two phases are then allowed to separate and the absorbance of the organic phase measured by passing a beam of radiation through this phase only.

A further embodiment of the invention is an apparatus for automatic simultaneous analysis of several components in, for example, blood serum. For example, it may be desired to simultaneously analyze serum for components 1, 2, 3 and 4. This is readily achieved by further developing the apparatus above, shown in FIG. 3. An instrument is built up with four dispensing devices or drop generators 101 A, 101 B, 101 A', 101 B', 101 A'', 101 B'', etc., four reaction vessel holders 125 and reaction vessel 124 units, each with an optical system typically consisting of lamp 129, lens 130, fixed filter 108 and photodetector 131. The rotatable filter wheel 121 is no longer necessary, but it would be desirable to automate the operation of the reaction vessel holder 125. Apparatus for the analysis of any reasonable number of components may be constructed from this basic system.

AUTOMATIC WET REACTION AND ANALYSIS WITH PROVISION FOR USE OF PLURALITY OF REAGENTS TO ANALYZE COMPONENTS IN A SAMPLE

In accordance with additional embodiments of this invention an apparatus and method is provided in which a sample to be analyzed can be automatically and efficiently contacted with a plurality of reagents, if necessary, to analyze a component in a sample and a plurality of such components can be so contacted. Typically means for analysis are provided.

In accordance with an embodiment of this invention an apparatus is provided which comprises means for introducing a liquid into a valve, a valve which permits said liquid to pass to a drop generator uncontacted with another liquid. Means for introducing at least one different liquid reactive with said first liquid into said valve, means for passing said liquids to a drop generator, means for producing a stream of substantially uniform droplets of each of said liquids, means for electrostatically charging said stream of droplets, means for controlling the path of said stream of droplets and a collector in which said at least one droplet of each liquid is received and rapidly diffused into each other. Means for monitoring the course of reaction between the liquids may also be provided to monitor or analyze the liquid collected.

In accordance with a complementary aspect of the invention a method is provided which comprises separately passing at least one liquid through a valve, into which a liquid reactive with each of said said at least one liquid is also passed, each of said at least one liquid being uncontacted with said different liquid, passing each of said at least one liquid through a drop generator to produce a stream of uniformly sized droplets, directing at least one droplet of each of said at least one liquid into a collector, passing said different liquid from said valve through said drop generator to produce a stream of uniformly sized droplets of this liquid and directing at least one droplet of this liquid into said collector whereby said liquids rapidly diffuse with each other. The course of the reaction may be monitored and analyzed.

Figure 6:
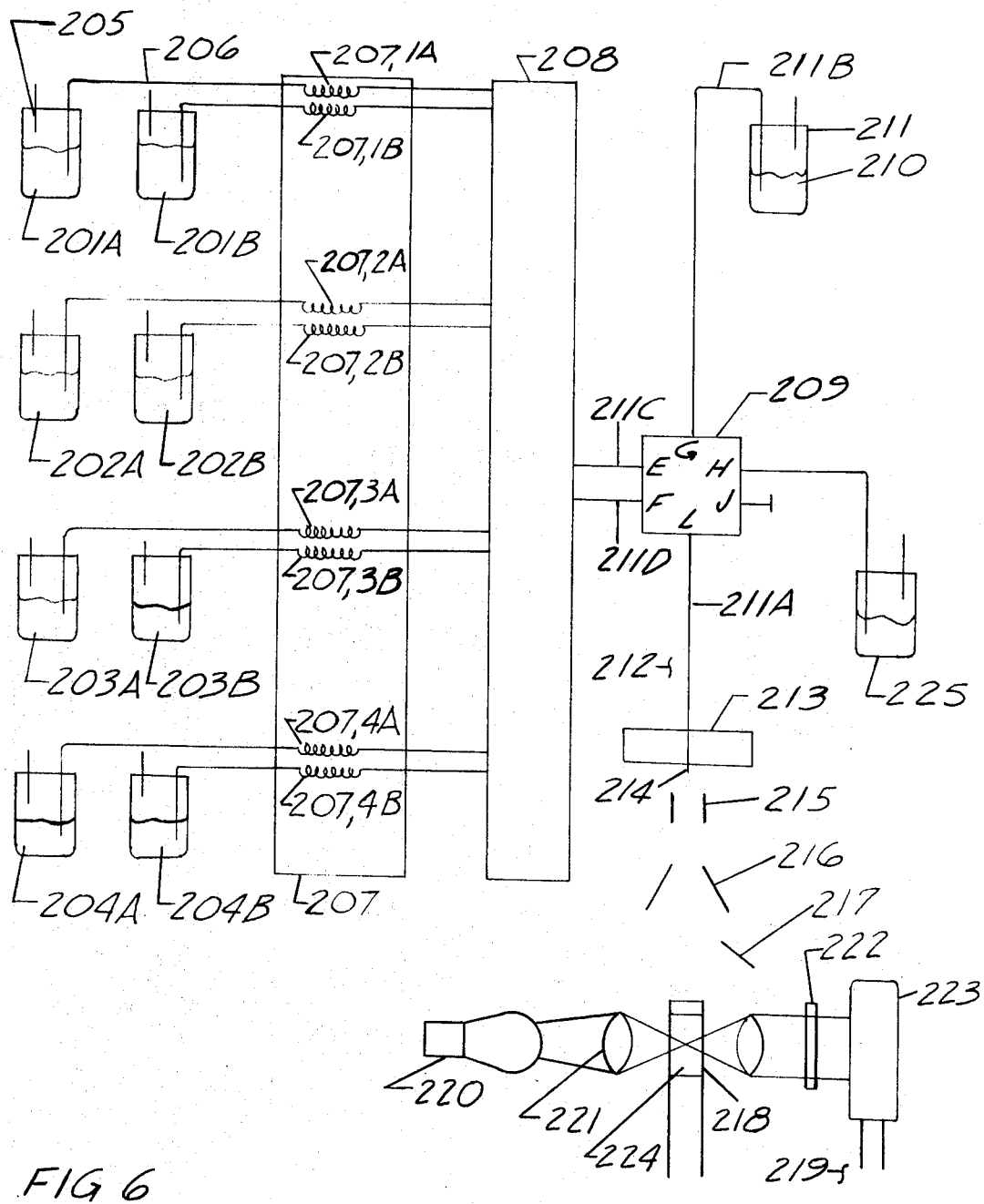
FIG. 6 is a diagrammatic view of an apparatus in which any one of four components in a sample can be rapidly diffused into and reacted with liquid chemical reagents and subjected to automatic analysis.

Referring specifically to FIG. 6 in which apparatus components, chemicals, voltages and analytical means are as in earlier described embodiments of the invention, except for currently described means, such as the valve system. The apparatus described in FIG. 6 provides particularly for analysis of four components in an unknown sample 210 such as blood serum. These components may be for example albumin, alkaline phosphatase, blood urea nitrogen and cholesterol. A plurality of reagents may be desired to analyze some of these components and therefore the apparatus includes means for holding a plurality of reagents (such as two or more) for each component to be analyzed. Thus, in analyzing blood serum sample 210 for albumin, HABA dye is reagent 201 A and no reagent 201 B is required; for alkaline phosphatase, reagents 202 A and 202 B are alkaline phosphatase buffer and AMP buffer respectively; reagents 203 A and 203 B are BUN color and BUN acid respectively; and reagent 204 A is cholesterol color reagent with no reagent 204 B being required.

A positive pressure, typically about 0.35 kg/cm$^2$, is applied so that the reagents used, e.g. 201 A; 202 A; 202 B; 203 A; 203 B; and 204 A are moved toward valve 209 through tubing 206 and heating coils 207,1 A; 207,1 B (not employed); 207,2 A; 207,2 B; 207,3 A; 207,3 B; 207,4A; and 207,4B (not employed), in heating bath 207. Valve 209 is typically formed by superimposing plates typically of metal coated with polytetrafluorethylene, upon a similar plate. One plate has several holes or ports, the other but one, in position such that, when one of the plates is rotated, the plate with one hole successively passes above or below each of the holes in the other plate. In the example herein illustrated, the reagents for alkaline phosphatase 202 A and 202 B and for BUN are heated to 37.5°C. Reagents for albumin 201 A and cholesterol are maintained at 25°C. Depending on components to be analyzed and reagents used, temperatures may be raised to 90° or higher. The reagents then pass to valve 208, typically containing plates which permit only specific reagents for a particular sample to pass therethrough. Thus, it is set so as to allow reagents for a particular component, that is 201 A; or 202 A and 202 B; or 203 A and 203 B; or 204 A to pass to entrance ports of automatic valve 209. Reagents indicated "A" pass to entrance port E on automatic valve 209 and reagents indicated "B" pass to entrance port F.

The blood serum sample 210 is placed in a container 211 and passed to entrance port G on automatic valve 209 using a positive pressure pumping technique with about 0.35 kg/cm$^2$ pressure. The valve 209 also has an entrance port H which admits a solvent 225 to wash out the system, such as water and a sealed port J. It also has an exit port L leading via tubing to a drop generator 212. The valve 209 can be electronically positioned so that liquid entering through ports E, F, G or H passes, uncontacted with other liquid, to port L. The drop generator, as earlier described herein, typically includes a piezoelectric crystal 213 which vibrates at an appropriate frequency, such as 4,000 Hz and a capillary 214. A charging electrode 215 and deflecting plates 216 are also provided. A trap 217 is also present. The drop generator is positioned over a reaction vessel or container 218 which is usually mounted with other vessels as shown in FIGS. 3 and 4, described above. These vessels 218 may be washed and dried in the manner illustrated in FIG. 4. A photometric system 219 usually consisting of light source 220, lenses 221, optical filter 222 and photodetector 223 is mounted as shown in FIG. 6 and can measure the optical transmission of solutions 224 in vessels 218.

Figure 7:
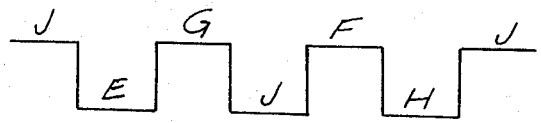
FIG. 7 is a timing diagram showing the sequence of operations of various components of the apparatus of FIG. 6.
Figure 7:
Figure 7:
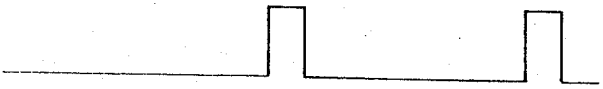
Figure 7:
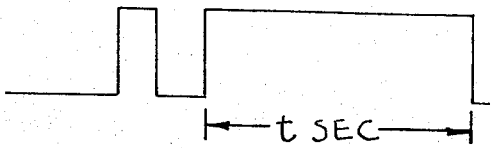

The mode of operation of the apparatus of FIG. 6 is illustrated in this figure and in FIG. 7 as follows.

The user may choose to analyze component 2 in a sample (say alkaline phosphatase in blood serum). He, therefore, places the sample 210 in a vessel 211 and fits it into the apparatus instrument. Valve 208 is turned to permit reagents 202 A and 202 B, that is alkaline phosphates substrate and AMP buffer respectively, to pass to automatic valve 209 at about 37.5°C. The appropriate optical filter 222 is positioned between the light source 220 and photodetector 223. It could be mounted on a filter wheel as in FIG. 5, described earlier. A button for analysis, which may be labeled ANALYZE is then pushed to activate electronic circuitry as indicated in FIG. 7 wherein:

a. Valve 209, initially in position J automatically moves to position E, allowing reagent 202 A to flow to drop generator 212.

b. Reagent 202 A emerges from the drop generator 212 as a stream of uniformly sized drops. The stream is deflected (by applying appropriate voltages to electrode 215 and deflecting plates 216) to trap 217 for a sufficient period of time to allow tubes 211 A and 211 C to be thoroughly washed out, typically about 0.1 second. Then the stream is allowed to pass into reaction vessel 218 for a precisely controlled period of time. (Or vice versa: solution can be deflected into the vessel and the undeflected stream passed to trap 217 and then to waste.) Thus an accurately measured of volume of reagent 202 A is placed in vessel 218.

c. Valve 209 moves to position G, allowing sample to flow to drop generator 212. Once again, the first position of the stream deflected to waste in order to wash out tubes 211 A and 211 B, then a precisely measured volume of sample solution is passed into the vessel 218.

d. The sample 210-reagent 202 A solution, 224, is preferably allowed to settle for a short time, such as a few milliseconds to a few seconds, then the photometer unit reads the intensity of radiation passing from lamp 220 through solution 224 and filter 222 to the photodetector 223. The resulting electrical signal is stored as a 100 percent transmission reading.

e. Valve 209 moves to position F, and the resulting stream is deflected to trap 217 for a sufficient time to allow tubes 211 A and 211 D to be thoroughly washed out, typically about 0.1 second, then a precisely measured volume of reagent 202 B is passed into vessel 218. Valve 209 moves to position H, allowing some wash water from vessel 225 to pass through the system to the trap 217. It then moves to position J and is inactive until the next analysis.

f. A chemical reaction between the sample 210 and the two reagents 202 A and 202 B occurs, resulting in the formation of a chemical compound which absorbs radiation at the wavelength transmitted by the filter 222. After an appropriate period of time, say 20 seconds, the photometer once again measures the intensity of radiation transmitted by solution 224 (diagram C, FIG. 7). The ratio of these intensities is then read out onto a recorder, display or printer. The concentration of component 2 in the sample will be related to this reading.

g. Alternatively, the photometer unit can be programmed to monitor the intensity of radiation transmitted by the solution, until it reaches a preselected fraction of the initial radiation intensity. The time taken for this to occur, $t$ sec., may also be related to the concentration of component 2 in the sample (diagram D, FIG. 7).

There are obviously a number of optional variations on this instrument. For example, reagents and sample could be pumped by other means than applying a positive pressure to their containing vessel; the operation of valve 208 could be automated, or the photometer unit could measure the intensity of fluorescence radiation rather than the intensity of radiation transmitted by a solution. Also an automatic sample handling device could be used with a recorder, or printer read out, to fully automate the analytical procedure. The 100 percent transmission reading may be taken prior to addition of reagent 202 A, or even immediately after addition of reagent 202 B, before appreciable chemical reaction occurs.

The apparatus of FIG. 6 has essentially the same advantages as are described for the apparatus illustrated in FIG. 3. It has the additional advantage also of being simpler to operate since only one drop generator is required and the only machine controlled moving part is valve 209. The time for chemical reaction in the method may take about a few milliseconds to about 10 minutes to complete.

It is an additional feature of this invention that the apparatus and method described with reference to FIGS. 6 and 7 may be modified to provide automatic successive reactions employing reagents useful for reacting with a sample and permitting analysis of several components in the sample. This is done by modifying the structure of the automatic valve of FIGS. 6 and 7 to provide additional entrance ports for several reagents which are kept out of contact with each other in the valve. This modified structure and method is illustrated and exemplified in FIGS. 8 and 9.

Figure 8:
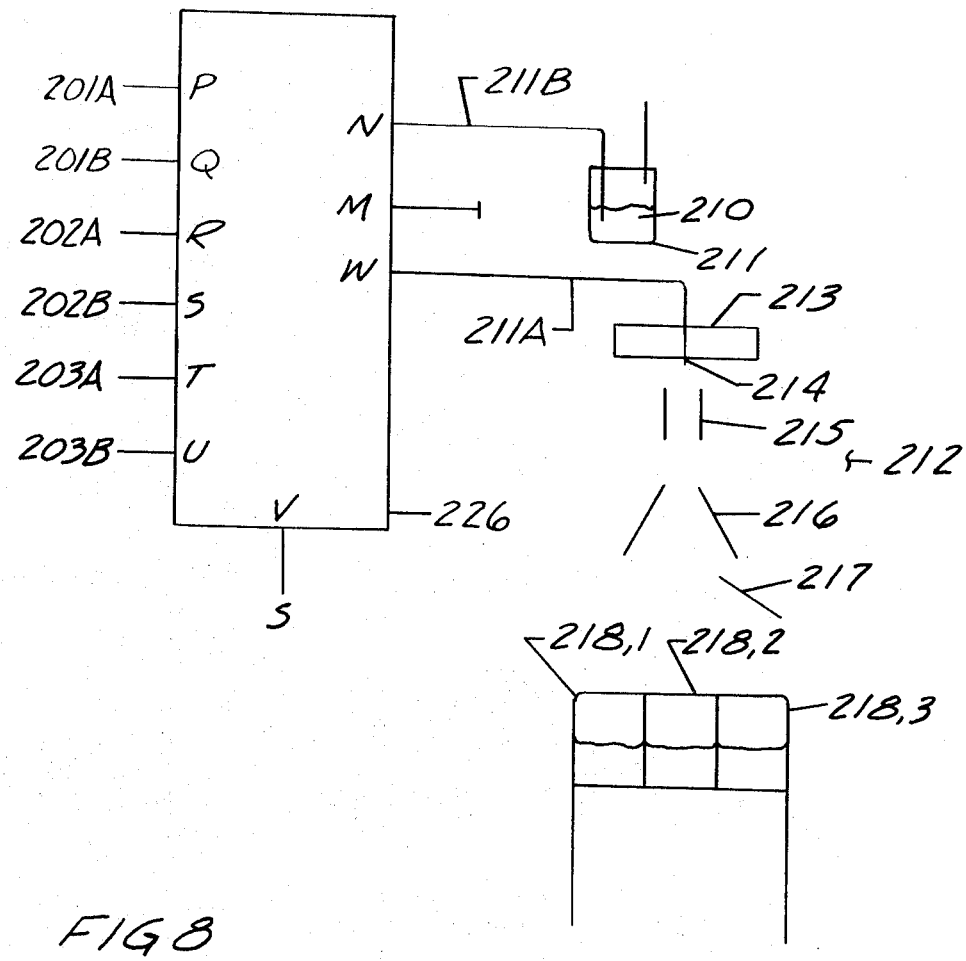
FIG. 8 is a detailed view of parts of an apparatus for automatic sequential analysis wherein three components in a sample can be successively rapidly diffused into and reacted with liquid chemical reagents and subjected to automatic analysis.

Referring now to FIG. 8 in which apparatus components, chemicals, voltages and analytical means are as earlier described, particularly with regard to FIG. 6, except as otherwise indicated: in FIG. 8, reagents for analyzing three components in a sample are indicated. Thus, to analyze blood serum sample for albumin, alkaline phosphatase and BUN, respectively, reagent 201 A is HABA dye and reagent 201 B is not required; reagent 202 A is alkaline phosphatase buffer and reagent 202 B is AMP buffer; reagents 203 A is BUN color and reagent 203 B is BUN acid. As illustrated in FIG. 8, the reagents (except for 201 B which is not necessary) have been delivered from vessels by pumping through the heating system directly to the automatic valve 226, of similar construction but with more ports than the valve 226 of FIG. 6. The operation of valve 226 is described below. Sample 210 in vessel 211 is also delivered by pumping to the automatic valve 226. Upon release from the valve 226, the liquids are passed through a drop generator 212 which typically includes a piezoelectric crystal 213, which vibrates at an appropriate frequency and a capillary 214. The streams of droplets passing from the drop generator 212 may be deflected with deflecting plates 216 to the trap 217 or into reaction containers or vessels 218,1; 218,2; and 218,3 for each set of reagents, that is 201 A; 202 A and 202 B; and 203 A and 203 B. A multiple photometer system (not shown in FIG. 9) is also provided. This system includes a light source which would be behind the plane of the figure, lenses, optical filters for each of the three reaction products and photodetectors for each of the three reaction products which would be above the plane of the figure.

More than three components in a sample may be reacted with appripriate further modification of the valve to receive additional reagents. Additional reaction containers or vessels mounted on spokes may be provided with appropriate washing and drying means.

Figure 9:
FIG. 9 is a timing diagram showing the successive sequence of operations of various components of the apparatus of FIG. 8.
Figure 9:
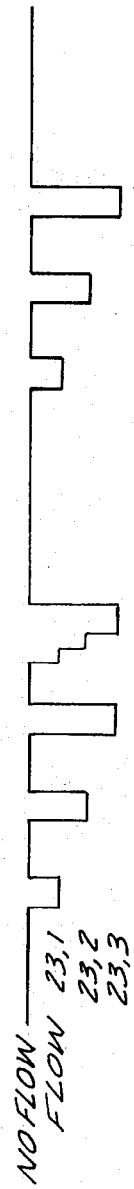
Figure 9:
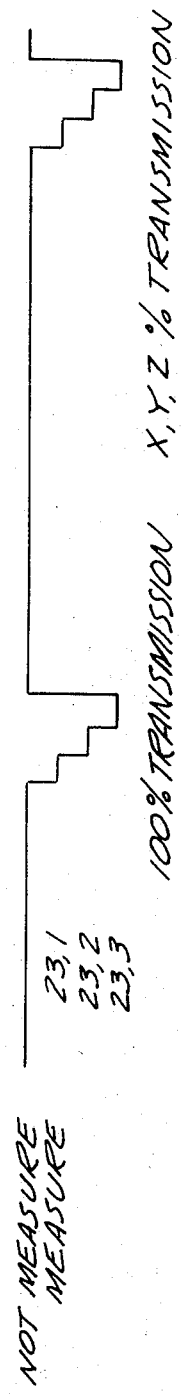

In FIG. 8 and 9 the apparatus operates by the following method.

a. The valve 226 which may be formed similarly to the valve 208 in FIG. 6, initially in position M moves to position P, allowing reagent 201 A to pass to drop generator 212. An appropriate voltage Vo (typically 6,000 volts) is applied to the deflecting plates 216 with constant charging electrode voltage (typically 400 volts), (or vice versa, with a constant deflecting plate voltage (typically 6,000 volts) and appropriate voltages on the charging electrode Vo, $V_1$, $V_2$ and $V_3$ (typically 400, 300, 200 and 100 volt, respectively)). This causes the first portion of the stream to pass to trap 217, then voltage $V_1$ (typically 5,000 volts) is applied to the plates, causing a measured volume of reagent 201 A to pass into reaction vessel 218,1.

b. Valve 226 moves to position R, and an appropriate volume of reagent 202 A is placed in vessel 218,2 by applying voltage $V_2$ (typically 4,000 volts) to the deflecting plates. Reagent 203 A is similarly placed in vessel 218,3.

c. Valve 226 moves to position V, allowing sample solution 210 to pass to the drop generator 212. As the sample solution is emerging as a stream of droplets, the series of voltages Vo, $V_1$, $V_2$ and $V_3$ is applied to the deflecting plates. Voltage Vo causes the first portion of the stream to be deflected to trap 217 to wash tubes 211 A and 211 B, voltage $V_1$ causes a measured volume of sample to be deflected into reaction vessel 218,1, voltage $V_2$ deflects sample into vessel 218,2 and voltage $V_3$ deflects sample into vessel 218,3. Valve 226 returns to entrance port M which is sealed.

d. The three photodetectors are used to read the intensity of radiation passing through the three solutions, and the resulting electrical signals are stored as 100 percent transmission readings 1, 2 and 3, respectively.

e. Valve 226 then automatically moves to positions Q, S and U. Reagent 201 B is not employed in the illustrated example and no liquid passes into port Q. Reagents 202 B and 203 B are added to vessels 218,2 and 218,3, respectively.

f. After an appropriate period of time, the photometer units measure the intensity of radiation transmitted by each solution, and read out the ratios of the transmission readings before and after addition of reagents 202 B and 203 B.

g. The shaft upon which the reaction vessels are mounted (not shown) is then rotated so as to bring clean, dry vessels into position under the drop generator, the sample is automatically changed and the cycle repeated on the following sample.

There is also a number of optional variations on this apparatus. For example, additional drop generators could be added, to dispense reagents, so as to reduce total analysis time. Also, additional drop generators could be programmed to add a given reagent to more than one reaction vessel. For example, it may be necessary to add acid such as hydrochloric acid to all reaction vessels, and the generator could be programmed, by varying the time for which voltages $V_1$, $V_2$ and $V_3$ are applied to add, say 0.01, 0.02 and 0.03 ml of a reagent to vessels 218,1; 218,2; and 218,3, respectively. In all cases, however, the sample will be dispensed by only one drop generator, as this gives the most efficient use of a limited volume of sample.

The apparatus featured in FIGS. 8 and 9 has a number of practical advantages.

a. It achieves the purpose of sequential analysis of several components in a sample.

b. A 2, 3, 4, 5 or more channel valve instrument is readily designed. c. The apparatus has only two moving parts, valve 226, and the shaft upon which the reaction vessels are mounted. (in the various embodiments of the invention, the reaction vessels may be mounted on a conveyor belt or other mounting means.)

d. The apparatus very efficiently measures out small volumes of sample with minimum possible waste. This is vital advantage in clinical analysis, where it is often required to carry out several determinations on one small sample.

e. The apparatus is inexpensive.

f. Reagent consumption is low.

APPARATUS AND METHOD FOR FILLING CONTAINERS WITH DROPLETS

In several of the earlier described embodiments and features of the invention, liquids are directed into container vessels.

In accordance with this aspect of the invention an apparatus is provided into which empty containers are introduced and filled containers are removed manually or automatically. The apparatus comprises an automatic means for moving or conveying containers into position to receive dispensed droplets of liquid, retaining the container in position to receive dispensed droplets of liquid, and removing the filled containers from a dispensing unit and a dispensing unit including pumping means to deliver liquid to a means for producing a stream of uniformly sized droplets, means for electrostatically charging said droplets and control means for directing a preselected volume of said droplets for injection into a container moving along the path of said droplets.

The method of this embodiment of the invention comprises automatically filling containers by passing liquid through a drop generator wherein a stream of uniformly sized droplets is formed, inducing an electrostatic charge on said droplets and directing a preselected volume of said droplets to enter the desired container. Furthermore, the containers are typically continuously moved through the filling apparatus and pass substantially under the dispsensing unit and the liquid droplets are deflected to follow the movement of the containers and the movement of the containers is synchronized with the path of the droplet stream to permit continuous filling of said containers. The dispensed volume into each vesel may be continuously adjusted.

Present methods for filling containers with an accurately known, small volume of liquid, and for handling corrosive liquids are not as satisfactory as the instant embodiment of the invention. In present methods:

a. Dispensing units using present pumping means can only dispense small volumes, typically 1 ml, with a precision of about ± 1 percent. Errors are caused by, for example, small drops of random size remaining on the injection tube, and by pump wear.

b. Such units contain moving parts which are liable to breakdown, and which require careful washing.

c. It is very inconvenient to change the dispensed volume. This is done by changing the piston stroke, and the apparatus must be stopped, the piston stroke altered, the apparatus started, and the dispensed volume checked. If this volume is incorrect, the above operations must be repeated.

d. The dispensing unit contains a number of different parts: piston, cylinder valves, etc. all of which may need to be corrosion resistant.

The embodiments of the invention in which apparatus is provided for containers to be filled with droplets from a drop generator is illustrated in FIGS. 10 and 11.

Referring to FIG. 10, the dispensing unit represented, generally by 301, includes tube 302 through which liquid such as cholesterol reagent is pumped and a drop generator including a capillary tube 304, and means for periodically vibrating this tube, typically a piezoelectric crystal 303, a charging electrode 305, deflecting plates 306 and containers or vessels to be filled of which three are shown - viz: 307, 308; and 309. The containers are preferably open wide on top so as to receive liquid easily which enters at various angles. Apparatus components earlier described may be used herein and chemicals and voltages may also be employed as previously indicated, except as otherwise stated.

The apparatus is operated as follows. Containers to be filled pass continuously, preferably at constant speed, under the dispensing head. Liquid is pumped continuously at a consant rate, typically 1–500 ml per minute, through the capillary tube 304, where it is broken up into a stream of substantially uniform droplets. The deflecting plates 306 are maintained at a constant potential difference, typically 6,000 volts, and a periodically varying voltage, typically between 0 and 400 volt, is applied to the charging electrode 305 to vary the trajectory of the drops. Or vice versa, the charging electrode is held at a constant voltage, and the voltage on the deflecting plates is periodically varied.

FIG. 11 shows the voltage waveform applied to the charging electrode. Considering now container 307, the empty container moves forward until it is in a position such that the undeflected stream enters it. This occurs at position A, FIG. 11. The container moves continuously to position B, FIG. 11, and the voltage applied to electrode 305 increases such that the stream deflection is increased so that the stream always enters the container. The container moves to position C, FIG. 11, and the stream is further deflected. When the container reaches position D, such that container 308 now occupies position A, the voltage on the charging electrode is reduced to zero, and the stream now fills container 308.

For a given liquid flow rate, the volume of liquid dispensed is proportional to the time during which it is dispensed. The volume dispensed can be altered by altering liquid flow rates, or by altering the dispensing time. For example, if the volume dispensed into container 308 is too low, the speed of moving the containers is reduced, and the voltage gradient of the charging electrode is correspondingly reduced so that the stream deflects into the slower moving container as in containers 310 and 311 in FIG. 11.

The above apparatus has a number of advantages:

a. The dispensing unit can be constructed without any moving parts.

b. The liquid being dispensed is pumped through only one tube. This greatly simplifies both the design of the unit, and washing procedures.

c. The use of electrostatic deflection permits the liquid stream to be cleanly switched from container to container, without spillage, and with a precision of about ± 0.2 percent.

d. The containers can be moved continuously, rather than stepped. This reduces the cost and increases the reliability of the container handling unit.

e. The volume dispensed can be adjusted as the apparatus is operating. If, for example, the dispensed volume spontaneously reduces by, say 0.5 percent during the operation, the apparatus may be readily slowed down by 0.5 percent to compensate for this, or alternatively, the liquid flow rate may be reduced by 0.5 percent during instrument operation and without loss of production.

There are obviously a number of optional variations on this apparatus. The containers may be stepped, and the liquid stream deflected to waste during the changing operation, and multiple dispensing units may be used, for example, a plurality of components may be added to a particular container or the containers. Alternatively, droplets may be diffused into liquid initially in the containers. Also, drop deflection may be achieved by other means in this and the other embodiments of the invention. For example, by periodically introducing a metal strip or other object which attenuates the electric field and around the deflecting plates, and thus causes a deflection of the drop stream.

LIQUID CHROMATOGRAPHY GRADIENT APPARATUS AND METHOD EMPLOYING A DROP GENERATOR

In accordance with further embodiments of the invention, the drop generator may be used to generate a stream of droplets to permit highly accurate mixing of gradients for liquid chromatography to pass into a column which contains for example various metallic ions, such as nickel, cobalt, magnesium, iron and zinc.

In liquid chromatography, the sample for analysis is placed on a column consisting of a solid support and a solvent, and the sample components are eluted by passing solvent through the column. In many cases, it is desired to elute the column with a continuously varying mixture of solvents. For example, the user may wish to begin elution with a mixture containing 10 percent solvent A and 90 percent solvent B, changing continuously to 50 solvent A and 50 percent solvent B over a period of 10 minutes, and returning to 100 percent solvent B after a further 20 minutes. This mixture of solvents is known as a solvent gradient. Solvent gradients are normally mixed using programmed mechanical pumps, or by pumping solvents through two or more chambers. For example, chamber 1 could be filled with solvent A, and chamber 2 filled with solvent B. Solvent A is pumped to chamber 2, and the contents of chamber 2 are fed to a column. This gives a continuously varying gradient.

These methods have two fundamental disadvantages:

a. Mechanical pumps, or other mechanical devices must be used. These are expensive, subject to breakdown and liable to corrode.

b. They can only produce a limited range of solvent mixtures.

The apparatus and method of these embodiments of the invention avoid these problems.

In accordance with an embodiment of the invention, an apparatus for forming gradients for liquid chromatography is provided comprising separate means for delivering different solvents to separate drop generators, means for electrostatically charging droplets produced in each of said drop generators and for controlling the direction of said droplets in order to permit accurately controlled amounts of droplets of each of said liquids to contact and diffuse with each other and means for collecting said contacted liquids thereby forming a gradient for liquid chromatography.

In accordance with a complementary embodiment of this invention a method for forming a gradient for liquid chromatography is provided comprising passing different liquid solvents through separate drop generators to produce separate streams of droplets of each solvent, electrostatically charging each of said streams of droplets to control the direction of particular amounts of the droplets toward a collecting means to cause such particular amounts of droplets to contact and diffuse with each other thereby forming a gradient for liquid chromatography and collecting the contacted liquids.

Referring now to FIG. 12, the apparatus illustrated includes solvent flasks 401 A and 401 B, containing solvents 402 A, typically concentrated aqueous hydrochloric acid, and 402 B, typically water, respectively, which provide the gradient. The means employed are as earlier indicated, except where specifically set forth. The solvents are pumped by applying a positive pumping pressure, such as about 0.35 kg/cm$^2$, via tubes 403 A and 403 B, such that solvents 402 A and 402 B pass along tubes 404 A and 404 B to two drop generators, represented generally by 405 A and 405 B, and corresponding in structure to drop generators described earlier in the specification. The drop generators include piezoelectric crystals 406 A and 406 B, capillary tubes 407 A and 407 B and charging electrodes 408 A and 408 B. Deflecting plates 409 A and 409 B, solvent traps 410 A and 410 B and collecting device such as funnel 411 are also present. Periodically varying voltages are applied to the piezoelectric crystals 406 A and 406 B as the solvent liquids 402 A and 402 B pass through the capillary tubes 407 A and 407 B, causing the liquid stream to be broken up into uniformly sized droplets 412 A and 412 B. An electrical charge can be induced in the droplets 412 A and 412 B by applying an appropriate voltage to the charging electrodes 408 A and 408 B and the droplets can be subsequently deflected by applying a large potential difference, typically about 6 KV, between the deflecting plates.

In operation, as stated, the deflecting plates 409 A and 409 B are maintained at a large potential difference and the voltage on the charging electrodes 408 A and 408 B may be set at either 0 volt, so that droplets are undeflected, 413 A and 413 B, and pass to trap 410, or at higher voltages, such as $V_1$ volt, typically 400 volts, so that droplets deflected 414 A and 414 B enter the collecting funnel 411 as shown. In the illustration of FIG. 12, 90 percent of the droplets in the collecting funnel 411 are from concentrated hydrochloric acid from 402 A which is being diluted by contact and diffusion with tbe remaining 10 percent of droplets of water from 402 B. Contact of the droplets 402 A and 402 B may take place before reaching the collecting funnel 411 or therein prior to passage through the funnel into a liquid chromatography column (not shown).

The voltages on the charging electrode are varied so as to achieve the desired gradient. Referring now to FIG. 13, it may be desired to feed 100 percent solvent A to the column for the time period represented by C, FIG. 13. Electrode 408 A is maintained at $V_1$ to deflect droplets of solvent 402 A into the funnel 411, and the electrode 408 B is maintained at 0 V to deflect droplets of solvent 402 B to trap 410 B. It may then be desired to feed 90 percent solvent 402 A and 10 percent solvent 402 B to the column during time period D. Electrode 409 A is maintained at $V_1$ volt for 90 percent of this time, and electrode 409 B is maintained at $V_1$ volt for the remaining 10 percent of the time. The flow rates through the two capillary tubes are thus balanced, so that the total flow rate to the column is constant. The voltages applied to the plates can be readily programmed to give any designed gradient, for examples, using a digital tape program, or a programmed timing wheel.

REMOVAL OF SOLVENT FROM COLUMN EFFLUENT IN LIQUID CHROMATOGRAPHY EMPLOYING A DROP GENERATOR

A further major problem in liquid chromatography is a lack of adequate detectors to monitor column effluent. Present detectors monitor effluent properties such as absorption of ultraviolet radiation and refractive index. The former type of detector is sensitive to ceratin classes of chemical compounds, and the latter type of detector is insufficiently sensitive, and cannot adequately handle solvent gradients. The apparatus and method according to further embodiments of the invention is a particularly convenient means for removing most or all of the solvent from the column effluent, converting the remaining sample components and solvent to a vapour, and passing this vapour to an appropriate detector.

In an embodiment of the invention an apparatus is provided comprising means for passing liquid chromatography column effluent to a means for forming uniformly sized droplets of said liquid upon emergence from said means, said means being in a heated vessel thereby substantially all or mostly evaporating solvent from the column effluent in said droplets and reducing said droplets in size and concentrating them, means for removing evaporated solvent, means for passing the more concentrated droplet through an aperture in said vessel, in a direct path from said means generating droplets, leading to another vessel heated to a higher temperature to permit the projected droplets to enter said other vessel and be vapourized and exit from the other vessel opposite the entering aperture through which exit the vapourized droplets pass. The exiting vapour may be analyzed with detecting means.

In a complementary embodiment of the invention a method is provided comprising passing liquid chromatography column effluent to a drop generator placed in a heated vessel containing an inert gas moving oppositely to the direction in which droplets are projected thereby forming a stream of uniformly sized droplets of said column effluent from which solvent in said column effluent is substantially all or mostly removed by evaporation, thereby reducing said droplets in size while concentrating them, passing said concentrated droplets through an aperture in a direct path from said drop generator into another vessel heated to a higher temperature, thereby varpourizing said concentrated droplets and passing said vapourized droplets out of the other vessel through an exit of said other vessel directly opposite the aperture.

Referring now to FIG. 14 wherein a feature of this embodiment is illustrated, liquid containing a sample solute in a solvent is delivered to the drop generator in the manner described earlier in the specification and the drop generator is operated as earlier indicated. Liquid chromatography column effluent as from a column of silica, is typically a solution of mixed low aliphatic alcohols, such as ethanol. The effluent is pumped, typically at about 0.35 kg/cm$^2$, through tubing 501 to the drop generator represented generally by 502 and typically containing a piezoelectric crystal 503 and a capillary tube 504. The column effluent is converted into a stream of substantially uniformly sized droplets 506, typically of a lower aliphatic acid in a solvent such as ethanol, which are projected into a vessel 505. An inert gas, typically nitrogen, is passed into vessel 505 at entrance 510 and moves generally in an opposite direction to the direction of the droplet stream and then to waste through exit 511. The solvent portion, typically ethanol of boiling point, 78°C, of the column effluent typically has a much lower boiling point than liquid solute, typically lower aliphatic acids, dissolved in it. The temperature in vessel 505 is maintained by a suitable heating means (not shown) at a sufficiently high temperature, typically 150°–550°C, preferably 500°C, such that the solvent is substantially all or mostly evaporated without substantially affecting the solute, so that the solvent is carried to waste by the stream of inert gas. Thus, at point 507, the droplets are substantially reduced in size and have a much higher concentration of solute than the original column effluent or the larger droplets 506 which emerger from the droplet generator 502. The reduced size or concentrated droplets then pass through an aperture 509 into a second vessel 508 which is maintained at an even higher temperature, typically 600°–850°C, preferably 800°C, sufficient to completely varpourize the droplets. Te resulting vapour is then carried forward by the momentum of the droplets from which they arose through an exit from the second vessel 508 directly opposite the aperture 509. Upon exiting the vapour is analyzed with a detector which is typically of the same type as those used in gas chromatography, for example an electron capture detector, a flame ionization detector, a mass spectrometer or the like.

In this embodiment of the invention, it is noted that the first chamber may have only one entrance, preferably near the emerging droplets, and a vacuum applied thereto, to withdraw vapourized solvent. This technique is particularly employed for analysis with a mass spectrometer.

The apparatus and method described for removing solvent from liquid chromatographic column effluent and subsequent vapourization have the following advantages.

a. Most or all the solvent in the column effluent is substantially removed in a very reproducible manner.

b. A liquid solute, such as a sample to be analyzed, and any remaining solvent is converted from a liquid into a vapour, which can be readily detected using a suitable detector.

c. The combination of the above two features, removal of most or all solvent, and with a consequent reduction in the detectors background signal, plus conversion to a vapour and use of typical gas chromatography detectors, gives excellent sensitivity and versatility.

There are several optional variations on this apparatus. For example, it is possible to use detectors which measure properties of the partially evaporated drops such as the magnitude of their deflection in an electrostatic field, which is related to the composition of the drop.

TITRATION AND SOLUTION PARAMETER APPARATUS AND METHOD EMPLOYING A DROP GENERATOR

In additional embodiments of the invention highly accurate and automated parameter adjustments such as titrations of solutions may be effected.

The titration of, for example, acids with bases, and the adjusting of pH or other solution parameter to a predetermined value, are exceedingly common laboratory operations. These operations may be carried out either manually or automatically. Automatic titrators typically consist of a titrating vessel, pH meter, and a titrant pump. The sample for analysis is placed in the titrating vessel and titrant is added to the vessel as follows.

a. Titrant is continuously added until the equivalence point is exceeded. During titration, pH or other solution parameter is continuously monitored and usually plotted against titrant volume. The equivalence point, or the volume of titrant required to adjust pH or other solution parameter to a preset value, is read off the resulting graph.

b. Titrant is added until a preset pH or other solution parameter is reached. This is usually achieved by pumping the titrant with a piston pump, continuously monitoring solution pH and controlling the piston pump from the pH electrode using a servomechanism, such that the pump progressively slowd down towards the endpoint and stops at the endpoint. The volume of titrant added is read from the pump.

These automatic titrators have a number of disadvantages:

i. They use piston pumps, which are unreliable and not particularly accurate.

ii. In case *a* above, it is necessary for the operator to read a graph, with consequent risk of error. In case *b* the piston pump progressively reduces its rate of delivery, with consequent loss of time.

iii. Both types of titrators are not particularly accurate with small volumes.

The apparatus and method according to these embodiments of the invention avoids these problems.

In accordance with an embodiment of the invention an apparatus is provided which comprises means for producing a stream of droplets of a liquid to be used in adjusting a parameter of a different liquid, means for electrostatically charging said droplets, means for controlling the direction of said droplets whereby at least one droplet is contacted with said different liquid to rapidly diffuse therewith and adjust a parameter thereof.

A method is provided which comprises passing a liquid capable of adjusting a parameter of another liquid through a drop generator to produce a stream of uniformly sized droplets, electrostatically directing a controlled amount of said droplets into contact with a different liquid to rapidly diffuse therewith and adjust a parameter thereof, said different liquid being in contact with a detector device which measures the adjusted parameter and ending the contact of said droplets with said different liquid at the parameter endpoint.

The apparatus and method is illustrated in FIG. 15 wherein titrant liquid is delivered to the drop generator in the manner described earlier in the specification and the drop generator is operated as earlier indicated. Thus, a liquid, which can measure a parameter of another liquid, such as a titrant, e.g. an inorganic acid such as hydrochloric acid, or an inorganic base such as sodium hydroxide, is pumped through tubing 603 to the drop generator, represented generally as 604 which includes a piezoelectric crystal 605 and capillary tube 606. An appropriate electrostatic charge is applied to the charging electrode 607 and the deflecting plates 608 to control the amount of droplets 610 which are projected into vessel 601. For example, a total of 1 ml of a basic titrant such as sodium hydroxide, may be required to neutralize an acid sample such as oxalic acid solution, and titrant liquid may be pumped through tubing 603 at a rate of 20 ml. per minute. The deflecting electrodes or plates 608 are typically maintained at a high potential difference, say 6 KV, and a pulsed voltage is applied to the charging electrode 607, in order that, say five successive droplets 611 enter vessel 601 and the next 95 droplets 612 are deflected to trap 609. The procedure is then repeated with five successive droplets 611 entering vessel 601 and the next 95 droplets 612 going to the trap 609, etc. The droplets 611 which enter vessel 601 contact titration sample liquid 613 e.g. oxalic acid solution, and rapidly mix and diffuse therewith, because of their small size and ratio of high surface area to volume as well as their high velocity, thereby permitting the titration sample-titrant mixture to rapidly reach equilibrium. The detector 602 in contact with titration sample liquid 613 continuously monitors the pH. Other solution parameters with liquids such as sodium fluoride may be adjusted to determine fluoride concentration. Alternatively, the system or instrument can be programmed so that a small volume of titrant (or the like) liquid droplets 611 enters the vessel 601 and mixed with and rapidly diffuses into titration (or the like) sample liquid 613, there is a pause of a few milliseconds, then the detector 602 is read and the process repeated as a further small volume titrant (or the like) liquid droplets 611 enters the vessel 601, etc.

Titrant liquid droplets 611 are added until the preselected pH is reached, at which point all titrant droplets 610 are diverted as droplets 612 to trap 609. Eventually the apparatus is shut off and the generation of droplets is halted.

The amount of titrant added as droplets 611 to titration sample liquid 613 is proportional to the time during which droplets 611 are added. Thus, if the titrant delivery rate and fraction of droplets 611 reaching the titration sample liquid 613 are known, the volume of titrant required can be calculated.

There are several optional variations on this apparatus. It could, for example, be used for Gran titrations, with the drop generator 604 dispensing several discrete volumes of titrant and with the detector 602 measuring pH after every addition. The equivalence point is then calculated from the pH and volume data. It can also be used to add, for example, fluoride to a sample until a preselected fluoride ion concentration as detected by a fluoride sensitive electrode, is reached.

This apparatus has the following advantages.

a. It achieves the desired result of automatically carrying out a titration.

b. The method of injecting the sample gives rapid mixing and hence very rapid chemical reaction and rapid titration.

c. The method of injecting the sample is very precise and gives high titration precision.

d. This method of titration is particularly suitable for titrating small samples.

e. This method is particularly suitable for adjusting solution parameters to preselected values in a highly accurate manner.

Further modifications within the scope of the invention described above will be apparent to one skilled in the art.

I claim:

1. An apparatus for effecting mixture of a stream of droplets of a first liquid with a different liquid which comprises means for producing a stream of uniformly sized droplets of a first liquid, means for electrostatically charging said droplets and control means for controlling the direction of droplets and means providing a different liquid in position such that at least one of said droplets of said first liquid is brought into contact with said different liquid to rapidly diffuse therewith.

2. The apparatus claimed in claim 1 wherein said means for producing a stream of droplets is a piezoelectric crystal.

3. The apparatus claimed in claim 1 wherein means are provided for maintaining the temperature of said different liquid.

4. The apparatus claimed in claim 1 wherein said means producing the different liquid is a means for producing a suspended drop.

5. The apparatus claimed in claim 1 wherein analytical means is provided to monitor a physical property of a reaction product formed by mixture of the two liquids.

6. The apparatus claimed in claim 5 wherein said analytical means is a photometric means for measuring light wavelength transmittance.

7. The apparatus claimed in claim 1 wherein said means providing the different liquid comprises a separate means for producing a stream of uniformly sized droplets, means for electrostatically charging said droplets and control means for controlling the direction of said droplets and collecting means for said contacted liquids is provided.

8. The apparatus claimed in claim 7 wherein said collecting means comprises a plurality of rotatably mounted collectors which are successively positioned to receive droplets of said first liquid and of reagents of different liquid reactive with components of said first liquid and heating means is provided to heat each of said collectors.

9. The apparatus claimed in claim 1 wherein a valve is provided through which said first liquid passes without contact with different liquid and prior to formation into droplets, and through which reagents of different liquid which are reactive with components of said first liquid also separately pass through said valve without contact with any other liquid, means for passing liquid emerging from said valve to said means for producing a stream of uniformly sized droplets and collector means for receiving at least one droplet of each of the liquids emerging from the means for producing droplets.

10. The apparatus claimed in claim 9 wherein said valve has sufficient ports to permit separate passage of said first liquids and reagents of different liquid which are reactive with a particular component of said first liquid and a separate valve is provided to retain reagents reactive with other components of the first liquid until the first reagents have passed through the valve.

11. The apparatus claimed in claim 9 wherein said valve is the sole valve employed and has sufficient ports to permit reagents of different liquid reactive with a plurality of components of said first liquid to pass through separate ports.

12. The apparatus claimed in claim 1 wherein a vessel is provided for containing said different liquid in position such that at least one said droplets of said first liquid is brought into contact therewith to rapidly diffuse therewith.

13. An apparatus for removing solvent from liquid chromatography column effluent comprising drop generating means for producing a single direct path stream of uniformly sized droplets of a liquid chromatography column effluent of a solution in a solvent upon emergence from said means, said means being in a vessel heated to a temperature sufficient to evaporate substantially all or most solvent in said droplets to reduce said droplets in size and concentrate them, means for removing evaporated solvent, an aperture in said vessel, in a direct path from said means generating droplets, leading to another vessel heated to a higher temperature sufficient to vapourize said concentrated droplets and an exit from the vessel heated to a higher temperature opposite the entering aperture, through which exit the vapourized droplets pass.

14. A method for mixing chemical liquids which comprises passing a first liquid through a drop generator to provide a stream of substantially uniformly sized droplets and electrostatically charging selectively pulsed droplets and directing at least one uncharged droplet from said stream into contact with a different liquid to rapidly diffuse therewith.

15. The method claimed in claim 14 wherein said different liquid is formed as a suspended drop.

16. The method claimed in claim 14 wherein the liquids chemically react with each other and a physical property of the reaction product is monitored.

17. The method claimed in claim 16 wherein the light wavelength transmittance of the reaction product is photometrically monitored.

18. The method claimed in claim 14 wherein said first liquid is blood serum and said different liquid is a reagent which is reactive with a component of said blood serum.

19. The method claimed in claim 14 wherein said different liquid is formed into uniformly sized droplets prior to contact of at least one of said droplets of said different liquid with at least one droplet of said first droplet by passing said different liquid through a separate drop generator to produce a stream of substantially uniformly sized droplets and said droplets of said different liquid are electrostatically charged and at least one droplet is directed into a collector and at least one droplet of said first liquid is also directed into the collector.

20. The method claimed in claim 19 wherein said first liquid is blood serum and said different liquid is a reagent which is reactive with a component of blood serum.

21. The method claimed in claim 19 wherein said droplets of first liquid contain a solvent which dilutes droplets of said different liquid.

22. The method claimed in claim 21 wherein said first liquid is water and said different liquid is concentrated hydrochloric acid solution.

23. The method claimed in claim 19 wherein said at least one droplet of each of said first liquid and said different liquid are contacted with each other prior to reaching said collector.

24. The method claimed in claim 19 wherein at least one droplet of one of said first liquid and said different liquid reaches said collector prior to the droplet of the other liquid.

25. The method claimed in claim 19 wherein a plurality of collectors are successively rotated into position to receive droplets of said first liquid and reagents of different liquids reactive with components of said first liquid.

26. The method claimed in claim 25 wherein each of said collectors is heated prior to receiving droplets of said first liquid and reagents of different liquids.

27. The method claimed in claim 14 wherein said first liquid passes through a valve without contacting any other liquid and then passes to said drop generator and at least one droplet of said first liquid is directed into a collector, and separate reagents of said different liquid reactive with components of said first liquid separately pass through the same valve and then pass from said valve to the same drop generator wherein a stream of substantially uniformly sized droplets of each of said reagents is produced and electrostatically charged and at least one droplet of each of said reagent is directed into said collector, whereby said first liquid is diffused with the different liquid entering said collector.

28. The method claimed in claim 27 wherein said reagents of different liquid prior to reaching said valve are passed into another valve which retains all reagents except reagents reactive with a particular component of said first liquid, the reagents reactive with said particular component are passed into the valve and after said reagents reactive with said particular component and said first liquid have separately passed through the valve, reagents retained in the other valve are passed to the valve.

29. The method claimed in claim 27 wherein said valve is the only valve employed and each of said reagents of different liquid reaches said valve but only one passes therethrough at a particular time out of contact with all other liquids.

30. The method claimed in claim 14 wherein said different liquid is in a vessel and upon contact therewith by at least one droplet of said first liquid a parameter thereof is adjusted in said different liquid, and continuing said contact until the desired end point of parameter adjustment is reached.

31. The method claimed in claim 30 wherein the parameter adjusted is pH, said first liquid is an acid or base titrant, said second liquid has its pH adjusted with said titrant and said detector monitors the pH.

32. A method for removing solvent from liquid chromatography column effluent comprising passing liquid chromatography column effluent of a solute in a solvent to a drop generator to produce a single direct path stream of uniformly sized droplets emerging from said drop generator, said drop generator being in a vessel heated to a sufficient temperature to substantially all or mostly evaporate the solvent content of said droplets thereby reducing said droplets in size and concentrating them, removing said evaporated solvent, passing said concentrated droplets through an aperture in a direct path from said drop generator into a vessel heated to a higher temperature than the temperature of said first vessel, said higher temperature being sufficient to vapourize said concentrated droplets and passing said vapourized droplets out of said vessel heated to a higher temperature through an exit directly opposite said aperture.

33. The method claimed in claim 32 wherein said vapourized droplets are subjected to gas chromatographic analysis.

34. A method of pulsing a selected number of droplets of a plurality of chemical liquids to be analyzed through a single drop generator comprising sequentially passing each of said chemical liquids to be analyzed through said drop generator to provide a stream of substantially uniformly sized droplets, pulsing the selected number of droplets which are uncontaminated with the previously passed liquid into a direction to permit analysis thereof and pulsing contaminated droplets and droplets in excess of the selected number to waste.

* * * * *